United States Patent
Xu et al.

(10) Patent No.: US 8,302,995 B2
(45) Date of Patent: Nov. 6, 2012

(54) METHOD OF CONTROLLING A FOUR-POINT OCCUPANT RESTRAINT BELT SYSTEM

(75) Inventors: BeiBei Xu, Canton, MI (US); Fubang Wu, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 12/557,625

(22) Filed: Sep. 11, 2009

(65) Prior Publication Data

US 2011/0062698 A1    Mar. 17, 2011

(51) Int. Cl.
*B60R 22/405* (2006.01)

(52) U.S. Cl. ......... 280/806; 397/484; 397/480; 397/479

(58) Field of Classification Search .................. 297/476, 297/479, 484, 480, 478; 280/806
See application file for complete search history.

(56) References Cited

U.S. PATENT DOCUMENTS

| | | | |
|---|---|---|---|
| 3,522,918 A * | 8/1970 | Wrighton ................... 244/122 R |
| 4,678,928 A | 7/1987 | Nishimura et al. | |
| 5,492,368 A * | 2/1996 | Pywell et al. ................. 280/806 |
| 5,533,756 A * | 7/1996 | Dybro et al. ................. 280/806 |
| 5,667,246 A * | 9/1997 | Miller, III ..................... 280/806 |
| 5,820,056 A | 10/1998 | Dybro et al. | |
| 6,076,894 A | 6/2000 | Busch | |
| 6,139,111 A | 10/2000 | Pywell et al. | |
| 6,336,656 B1 * | 1/2002 | Romeo ......................... 280/733 |
| 6,375,270 B1 | 4/2002 | Sullivan et al. | |
| 6,564,895 B1 | 5/2003 | Boehmler | |
| 6,769,716 B2 | 8/2004 | Rouhana et al. | |
| 6,773,075 B2 * | 8/2004 | Rouhana et al. ............... 297/484 |
| 6,817,629 B2 * | 11/2004 | Herberg et al. ............ 280/801.1 |
| 6,829,952 B2 | 12/2004 | Stanley et al. | |
| 7,011,341 B2 | 3/2006 | Herberg et al. | |
| 7,147,251 B2 * | 12/2006 | Bell et al. ...................... 280/806 |
| 7,195,092 B2 | 3/2007 | Wu et al. | |
| 7,513,575 B1 * | 4/2009 | Go ................................ 297/486 |
| 7,744,031 B2 * | 6/2010 | Ng et al. .................... 242/390.8 |
| 7,908,058 B2 * | 3/2011 | Takemura ........................ 701/45 |
| 8,002,348 B2 * | 8/2011 | Jessup et al. ................ 297/216.1 |
| 2004/0036345 A1 * | 2/2004 | Herberg et al. ............... 297/480 |
| 2004/0113412 A1 * | 6/2004 | Go ................................. 280/808 |
| 2004/0251675 A1 * | 12/2004 | Herberg et al. ............... 280/806 |
| 2005/0206152 A1 * | 9/2005 | Delventhal et al. ........... 280/805 |
| 2006/0226694 A1 * | 10/2006 | Higuchi et al. ............... 297/480 |
| 2006/0243844 A1 * | 11/2006 | Kosugi et al. ................. 242/374 |
| 2007/0290535 A1 * | 12/2007 | Meredith et al. ........... 297/217.1 |
| 2008/0296884 A1 | 12/2008 | Rouhana et al. | |
| 2009/0094810 A1 * | 4/2009 | Rouhana et al. ................. 24/630 |
| 2010/0025972 A1 * | 2/2010 | Nezaki ........................ 280/730.1 |
| 2010/0270786 A1 * | 10/2010 | Kump et al. .................. 280/805 |

* cited by examiner

*Primary Examiner* — Paul N Dickson
*Assistant Examiner* — Nicole Verley
(74) *Attorney, Agent, or Firm* — Frank A. MacKenzie; Brooks Kushman P.C.

(57) ABSTRACT

A vehicle occupant restraint system provides protection during a collision and subsequent rollover. Left and right shoulder belt retractors are actuated differentially in reaction to a lateral component of the crash force to lock one of the shoulder belts while allowing the other shoulder belt to extend under loading applied by a seat occupant. If a subsequent rollover is detected, the second shoulder belt retractor is actuated to lock or retract the second shoulder belt. The second shoulder belt may be retracted to achieve a specified level of tension and/or to achieve an extended length approximately equal to the extended length of the first shoulder belt.

16 Claims, 4 Drawing Sheets

METHOD OF CONTROLLING A FOUR-POINT OCCUPANT RESTRAINT BELT SYSTEM

BACKGROUND

1. Technical Field

The present invention relates to automotive vehicle occupant restraint belt systems, and specifically to a control method for a four-point occupant restraint belt system to protect a seat occupant during a side impact collision and subsequent vehicle rollover.

2. Background Art

Automotive vehicles are usually equipped with occupant restraint belt systems for securing an occupant of the vehicle in his/her seat during a collision or the like. Some passenger vehicle occupant safety systems employ a four-point belt consisting of a lap belt extending across the seat occupant's lap and anchored to the seat and/or vehicle at both its ends, and a pair of shoulder belts. The left and right shoulder belts are commonly anchored to the seat at points adjacent each of the seat occupant's shoulders, extend downwardly over the torso, and are secured to the lap belt by one or more releasable latches.

The upper end of the shoulder belts may be wound around spools that allow the belts to extend and retract as necessary for comfort, convenience, and safety. It has been proposed to equip the spools with devices such as locks, spring- or motor-operated retractors, load limiters, and pre-tensioners. Examples of such devices and systems are described in U.S. Pat. Nos. 6,773,075; 6,375,270; and 7,625,048.

In most crash scenarios it is considered most safe to lock or tighten both the left and right shoulder belts in response to (or in preparation for) a vehicle impact, so as to keep the occupant securely restrained in the seat. This locking or tightening may be accomplished by locks, retractors, and/or pre-tensioners, and may be triggered by various impact and/or pre-impact sensors.

Some research has indicated, however, that in some side-impact collisions occupant safety can be improved if the shoulder belt on the side of the occupant's body that is away from the received impact is not locked or tightened, but rather is loosened so that the occupants torso may move in the direction in which the impact is directed. In a crash where the left side of the vehicle is struck, for example, the right shoulder belt should be loosened to permit the occupant's torso to move to the right.

In a real-world crash scenario, however, it is possible for a side impact to be immediately followed by a vehicle rollover. During a rollover, it is most likely that optimum safety is achieved by having both of the shoulder belts tightened.

SUMMARY

The present invention is directed toward a method and apparatus for improving occupant safety during a vehicle crash in which a side impact is followed by a potential or actual rollover event.

According to the disclosed embodiment of the present invention, a method of controlling an occupant safety system of an automotive vehicle during a collision and a subsequent rollover condition comprises the steps of detecting a lateral component of force applied to the vehicle during the collision and activating left and right shoulder belt retractors associated with an occupant seat in a differential manner. In reaction to the detected direction of the lateral component of force, a first belt retractor engaging a first shoulder belt is locked to prevent extension of the first shoulder belt and a second belt retractor engaging a second shoulder belt is unlocked to permit extension of the second shoulder belt. If a subsequent rollover condition is detected, the first belt retractor is then activated to retract the second shoulder belt.

In a further disclosed embodiment of the invention method, at least one the first and second shoulder belts is pre-tensioning prior to the step of locking the first belt retractor and unlocking the second belt retractor.

In a further disclosed embodiment of the invention method, the second belt retractor is controlled after unlocking to limit an extended length of the second shoulder belt.

In a further disclosed embodiment of the invention method, the second belt retractor is controlled after unlocking to achieve a load-limiting effect in the second shoulder belt.

A further disclosed embodiment of the invention is a method of controlling an occupant safety system of an automotive vehicle comprising a crash sensor, a rollover sensor, an occupant seat, first and second shoulder belts associated with the occupant seat, and first and second belt retractors engaging the first and second shoulder belts respectively. The method comprises operating the crash sensor to detect a direction of force applied to the vehicle during a collision, reaction to the direction of force by differentially actuating the first and second belt retractors to prevent extension of the first shoulder belt and permit extension of the second shoulder belt under loading applied by a seat occupant, operating the rollover sensor to detect a rollover condition occurring after the collision, and reacting to the rollover condition by actuating the second belt retractor to retract the second shoulder belt.

A further disclosed embodiment of the present invention is an occupant safety system for an automotive vehicle comprises first and second shoulder belts associated with an occupant seat, a first belt retractor operatively engaging the first shoulder belt, a second belt retractor operatively engaging the second shoulder belt, a vehicle impact sensor configured to detect a direction of force applied to the vehicle during a crash, a rollover sensor configured to detect an impending rollover condition of the vehicle, and a system controller configured to lock the first retractor and unlock the second retractor in reaction to the direction of force and to subsequently lock the second retractor in reaction to the rollover condition.

BRIEF DESCRIPTION OF THE DRAWINGS

Hereinafter the invention will be further described with reference to the accompanying drawings showing a non-limiting embodiment of an occupant restraint belt system according to the invention.

DETAILED DESCRIPTION

Figure 1:
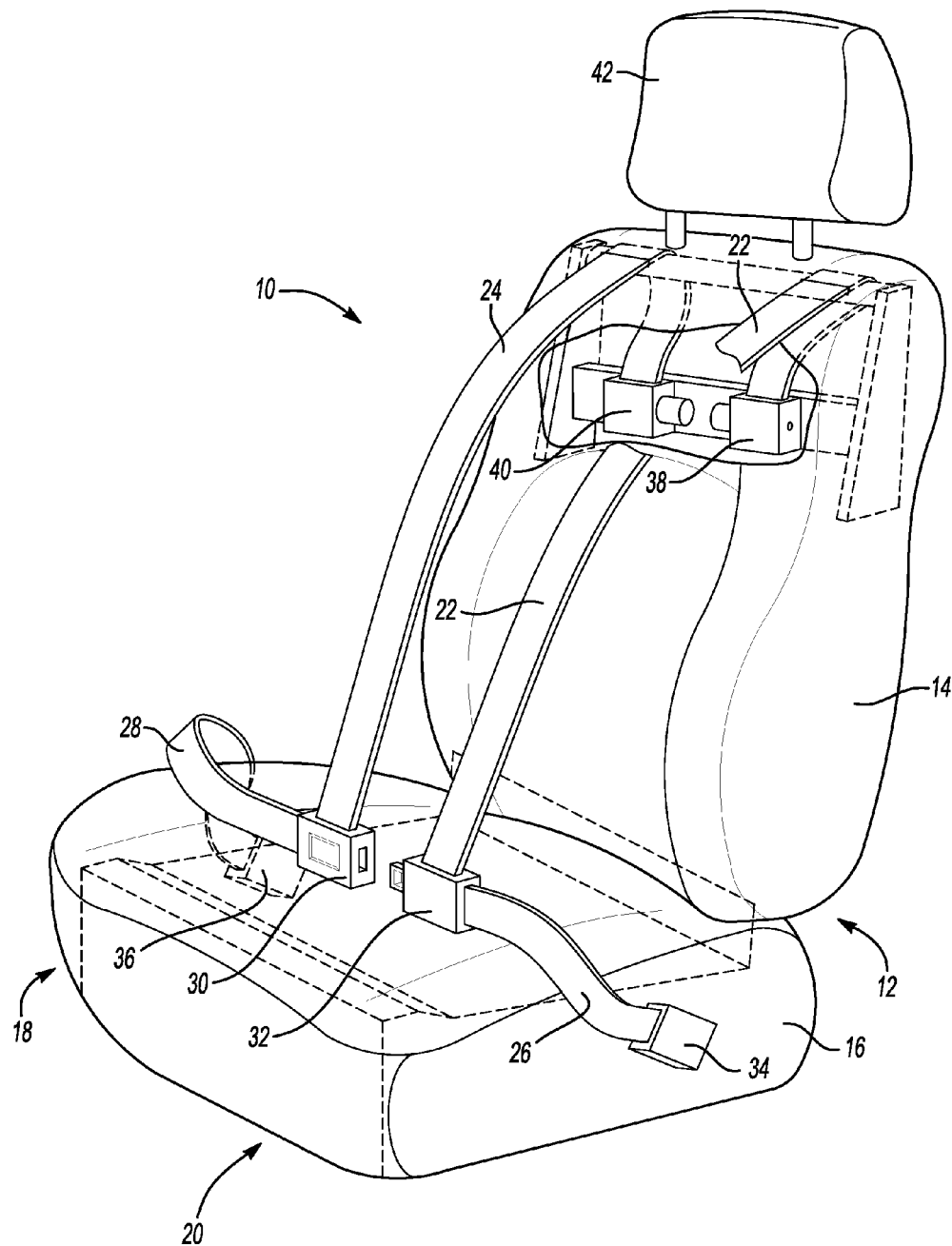
FIG. 1 is a perspective view showing schematically a vehicle seat and associated four-point safety belt as may be used in an embodiment of the invention.
Figure 2:
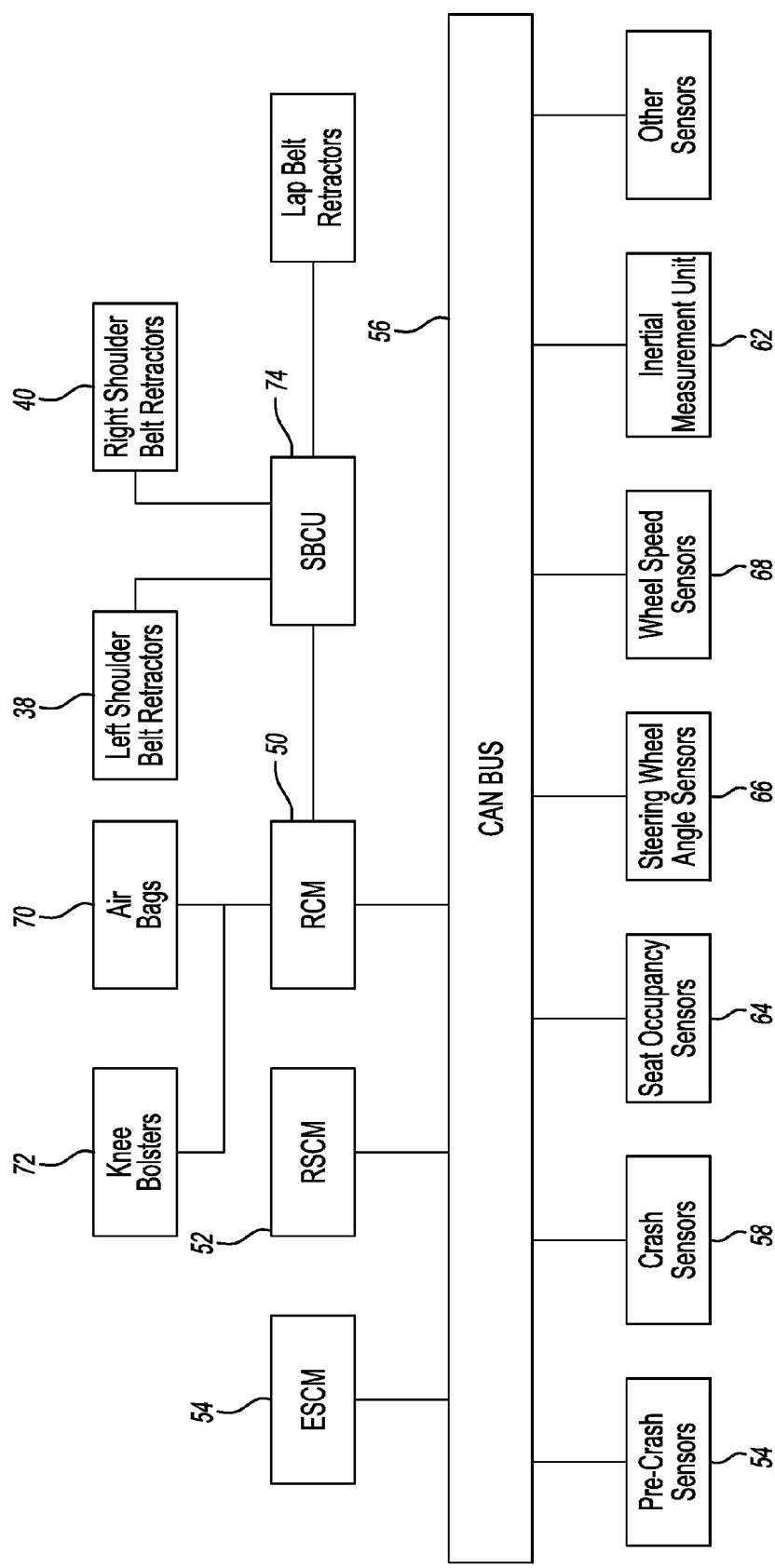
FIG. 2 is a functional block diagram showing an exemplary vehicle safety control system in accordance with an embodiment of the invention.

Referring to the drawings and in particular FIGS. 1 and 2, one embodiment of a seat belt restraint system 10, according to the present invention, is shown. A seat 12, typically for use in an automotive vehicle (not shown), includes a generally upright seat back 14 for supporting the back of a seated occupant and a generally horizontal seat bottom 16 projecting forwardly from the bottom portion of the seat back 14.

For purposes of description only, seat 12 will be considered to be on the left side of the vehicle such that the right side 18 is adjacent the inboard side or middle of the vehicle and the left side 20 is adjacent the outboard side or outside of the vehicle as is commonly known in the art.

The seat belt restraint system 10 includes left and right shoulder strap belts 14, 16 respectively, left and right lap belt straps 26, 28 respectively. Each lap belt 26, 28 is anchored at an outboard end to the vehicle seat and the opposite or inboard ends of the two straps are fastened together during use by a two-piece buckle or latch mechanism 30, 32. The lower ends of the shoulder belts 22, 24 respectively, are connected to the two portions 30, 32 of the buckle mechanism. The buckle mechanism can be of any conventional type and the lower ends of the shoulder belts can be attached to the buckle portions 30, 32 in any conventional manner. For example, the lower ends of the shoulder belts may be permanently (non-detachably) attached to the buckle mechanism, or they may be detachably connected by a buckle or latch mechanism (not shown). In this manner, the four-point seat belt mechanism or system 10 can be easily secured around the occupant simply by latching the buckle 30, 32 so that the ends of all four of the belts 22, 24, 26, 28 are secured together at a common point.

Outboard ends of the lap belts 26, 28, may be connected to spool-type belt retractors 34, 36. Retractors 34, 36 may be attached to outboard surfaces of the seat bottom 16 as shown in FIG. 1, or they may be contained within seat bottom, or the retractors may be positioned on the floor of the vehicle or otherwise attached directly to the vehicle. The retractor mechanisms 34, 36 may be of the type using spring mechanisms and/or electric motors which allow the lap belts 26, 28 to be retracted and be rewound on the spools of the retractors when the buckle mechanism is opened and the buckle portions 30, 32 are detached.

Alternatively, outboard ends of the lap belts 26, 28 may be anchored to the sides of the vehicle seat 12 or to the vehicle structure adjacent the sides of the seat by lap belt anchors. When the ends of the lap belts are anchored in this manner, they are preferably adjustable in length through a cinching mechanism (not shown) located either in the buckle or attached to the lap belts by other means known in the art.

The seat belt restraint system 10 also includes a left shoulder belt retractor 38 and a right shoulder belt retractor 40 which operatively engage upper ends of shoulder belts 22, 24. In the embodiment as depicted in FIG. 1 shoulder belts retractors 38, 40 are mounted in the seat back 14 with the shoulder belts 22, 24 passing through guide openings formed in the upper portion of seat back 14 then extending downwardly to reach the retractors 38, 40. Alternatively, shoulder belt retractors 38, 40 may be located in housings (not shown) attached to the upper portion of seat back 14 outboard of the headrest 42, or to vehicle structure adjacent the upper seat back, as is well known in the art.

Each of left and right shoulder belt retractors 38, 40 comprises a rotating spool engaging the upper end of respective shoulder belts 26, 28 to provide adjustment of the length of the belt to accommodate seat occupants of different sizes. Retractors 38, 40 also comprise all associated mechanisms (not shown) interacting with the spools to control extension and retraction of the shoulder belts to improve seat occupant comfort and safety during dynamic events. Such mechanisms may include any appropriate combination of springs; locks; pyrotechnical, electrical, mechanical, and magnetic actuators; and rotation/position sensors (Hall effect, for example).

As is well known in the occupant restraints arts, the above-listed mechanisms and/or control algorithms allow retractors 38, 40 to provide functions such as load limiting and pre-tensioning of the shoulder belts to achieve proper restraint of the occupant during a crash. See U.S. Pat. Nos. 6,773,075B2 and 6,375,270 for further description and discussion of load limiting and pre-tensioning.

Referring now to FIG. 2, an example of a vehicle safety control system in accordance with one embodiment of the invention includes a restraints control module (RCM) 50, a roll stability control module (RSCM) 52, and an electronic stability control module (ESCM) 54. One or more of the control modules may, as is well known in the vehicle electronics art, be microprocessor based such as a computer having a central processing unit, memory (RAM and/or ROM), and associated input and output buses. The controller may be an application-specific integrated circuit or other logic devices known in the art.

The modules of the safety control system are, as is well known in the art, interconnected by a high-speed data bus such as a Controller Area Network (CAN) bus 56. An electronic data protocol suitable for the specific type of data bus is used for the electronic signals passed between the modules.

The various control modules receive input signals from a number of sensors, such as crash sensors 58, pre-crash sensors 60 (radar, lidar, vision, etc.), an inertial measurement unit (IMU) 62, seat occupancy sensors 64, a steering wheel angle sensor 66, and wheel speed/spin sensors 68. The output signals of the sensors may be carried over the CAN bus 56 so any of the control modules may share the sensor outputs.

In known vehicle safety systems, ESCM 54 uses input signals from these and other sensors control the vehicle wheel brakes and/or steering system to reduce or eliminate skids and other undesired vehicle dynamic behavior. The RSCM 52 uses input signals to detect a rollover condition (actual or impending) and apply braking and/or steering corrections to reduce the likelihood of a vehicle rollover event. The RCM 50 controls the operation of multiple occupant restraint safety systems such as seat/shoulder belts, air bags 70, and active knee bolsters 72.

A shoulder belt control unit (SBCU) 74 is also connected to CAN bus 56 so that it may receive input signals from the safety-related control modules and sensors. SBCU 74 controls the operation and actuation of shoulder belt retractors 38, 40 in accordance with the present invention.

It will be apparent to one of skill in the vehicle electronics arts that FIG. 2 is but one of many possible system architectures that may be used to effect monitoring and control of the various systems as disclosed herein. The disclosed functionality may be distributed differently among one or more of the various control modules and remain within the scope of the invention. Similarly, the functions of crash sensors 58, pre-crash sensors 60, and IMU 62 may be performed by a combined sensor module or by any number of sensors and/or sensor modules.

Figure 3:
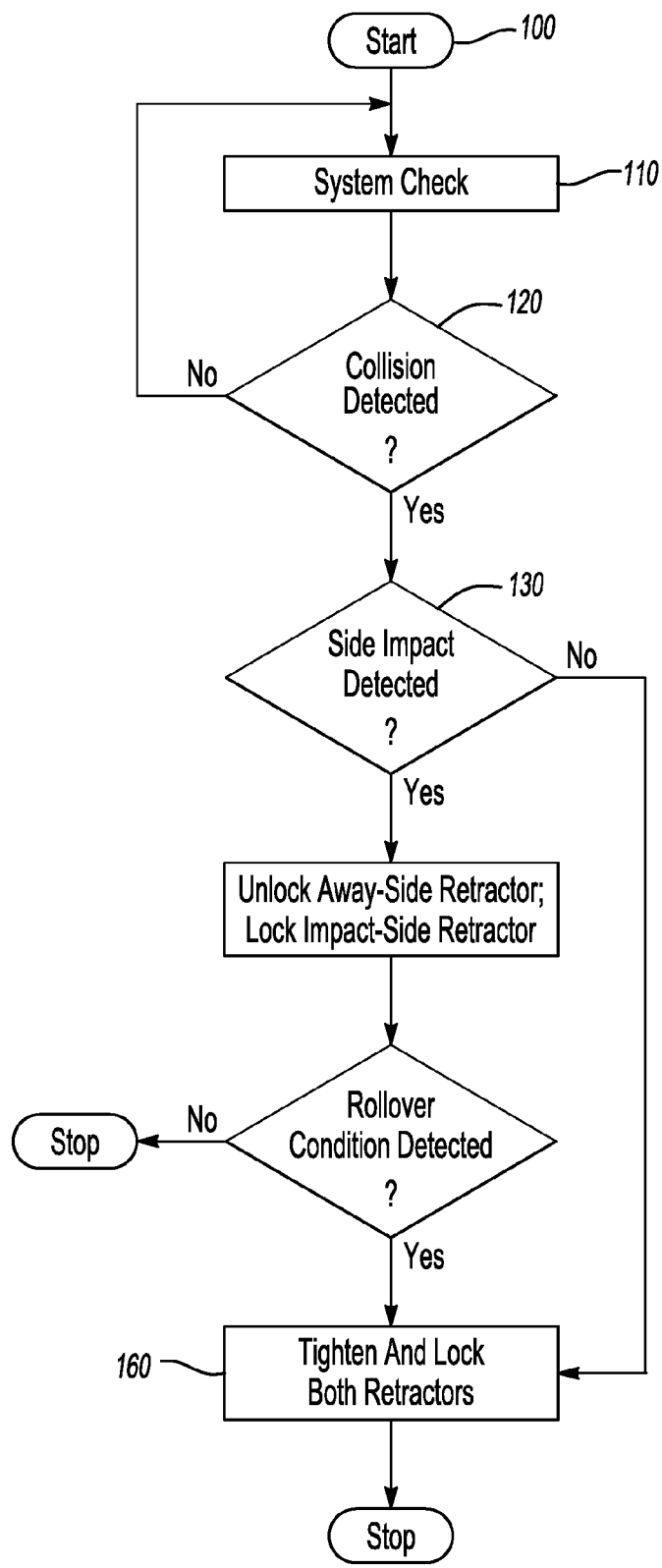
FIG. 3 is a flow chart showing the steps of an exemplary algorithm in accordance with an embodiment of the present invention.

The flow chart of FIG. 3 shows the steps of an exemplary algorithm in accordance with an embodiment of the present invention. Starting at block 100, the method progresses to block 110 where a system self-diagnostic check is accomplished. If the self-check indicates any actual or impending failure of the system, appropriate actions are taken, such as illumination of a warning light (not shown) to alert the vehicle operator.

Progressing to block 120, RCM 50 (or other appropriate safety-related control module and/or software) monitors all available sensors (such as crash sensors 58, pre-crash sensors 60, and IMU 62) to detect a collision. In the present discussion, the term "collision" will be used to describe both an actual and an impending collision between the vehicle and another object.

If a collision is detected (block 120, "Yes"), RCM 50 determines whether the collision constitutes a side impact. In the present discussion, a "side impact" is understood to mean any collision in which the vehicle experiences sufficient lateral acceleration that occupant safety may be improved by controlling the left and right shoulder belts in the differential manner as described hereinbelow.

If the collision is not classified as a side impact (block 130, "No"), SBCU 74 activates shoulder belt retractors 38, 40 in a manner that maximized occupant safety in the type of collision that has been detected. Block 160 indicates one possible reaction, for a frontal impact for example, in which powered retractors 38, 40 are activated to tighten both the shoulder belts symmetrically and lock them.

Figure 4:
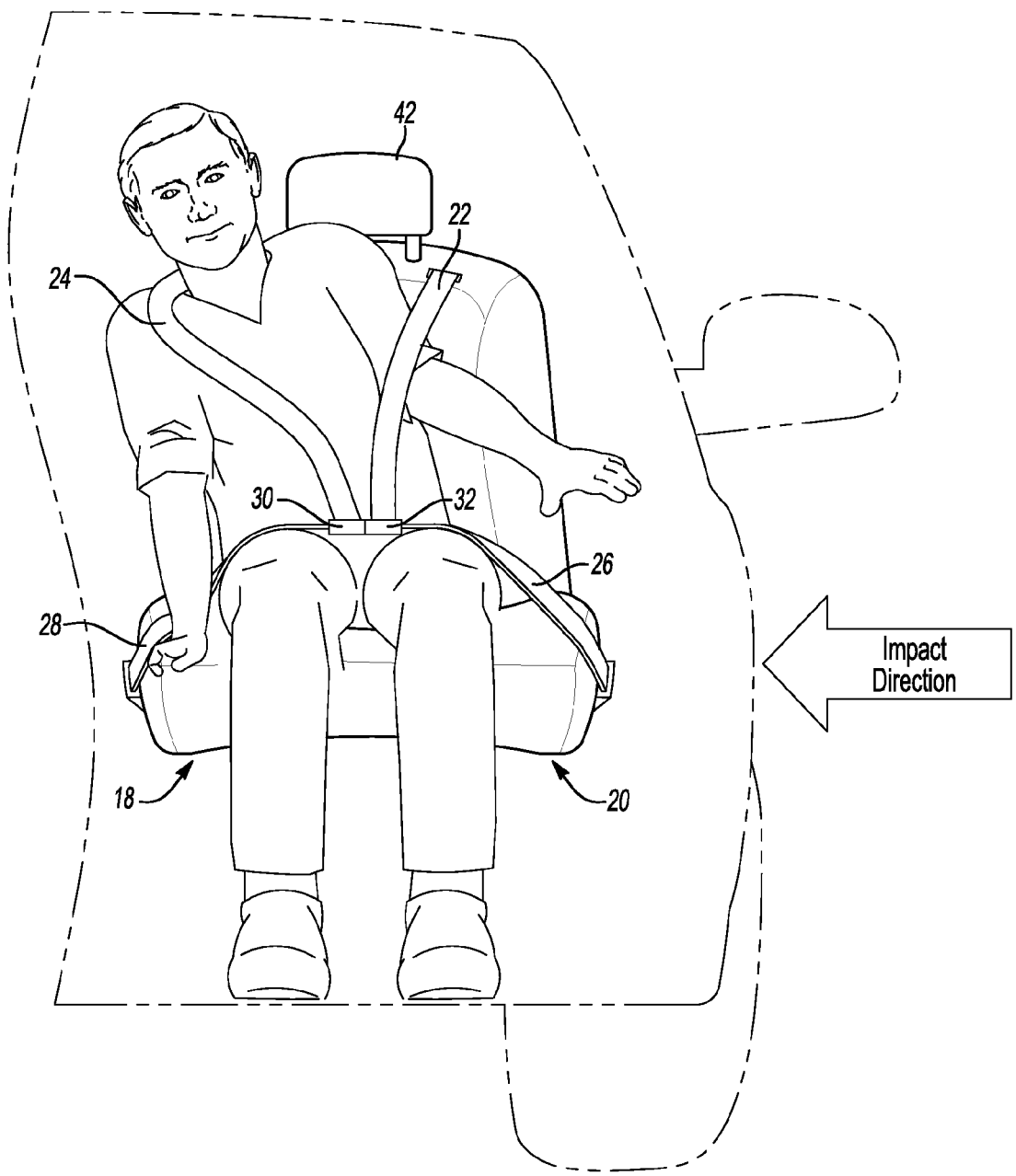
FIG. 4 is a conceptual view showing the seat and belt system of FIG. 1 in operation during a side-impact collision.

If a side impact is detected (block 130, "Yes"), the left and right shoulder belt retractors 38, 40 are activated differentially in the manner to be described below. The differential activation is intended to allow the occupant's torso to move in the direction in which the impact is directed. (See FIG. 4) For example, in a crash where the left side of the vehicle is struck so that the force of impact is directed to the right, the occupant's torso should be allowed to move to the right. In the following discussion, the side of the vehicle, seat, and occupant that is struck will be referred to as the "impact side," and the side of the vehicle, seat, and occupant away from the impact will be referred to as the "away side." Research has shown that in many side impact situations allowing this movement to the away-side may reduce the likelihood and/or severity of injury.

To achieve this desired result the RCM 50 and/or SBCU 74 determines the direction (left or right) in which the lateral force of the impact is applied to the vehicle. Depending upon the direction of the lateral force, SBCU 74 locks the impact-side shoulder belt retractor and unlocks the away-side retractor. Unlocking the away-side retractor allows the away-side shoulder belt to extend from its spool under the force applied by the occupant's torso in reaction to the impact force. A possible position of the seat occupant's torso after unlocking and extension of the away-side shoulder belt is shown conceptually in FIG. 4.

It should be noted that the RCM 50 and/or SBCU 74 may initially activate one or both of the retractors 38, 40 to pre-tension the shoulder belts 22, 24 early in (or in anticipation of) the collision, with the away-side retractor then being unlocked when the crash is identified as a side impact.

In addition to unlocking the away-side retractor, the SBCU 74 may limit the length of shoulder belt that is allowed to extend from the spool. This may be accomplished by counting the number of revolutions of the spool to measure the extended length, and then locking the retractor and/or applying a load-limiting force to the spool.

It is also possible for the SBCU 74 to control the away-side retractor to achieve a load-limiting effect on the away-side shoulder belt, allowing the belt to extend as necessary to limit the amount of force applied by the belt to the occupant. Load-limiting involves limiting the tension in the belt to a desired level, which may be dependent upon the size/weight of the seat occupant (as measured by an occupant sensing system, for example) and/or upon the amount of lateral force and/or acceleration experienced by the vehicle during the collision.

As the detected collision continues, the vehicle safety-related sensors and control modules continue to monitor vehicle conditions. During or after the collision (side impact), the RSM 50 (and/or other safety-related control modules) may detect a rollover condition. This rollover condition may occur as a direct result of the force of the side impact tipping the vehicle upward, or it may occur due to a secondary impact, or it may occur due to a so-called "tripping" event. A tripping event occurs when the vehicle is moving laterally (usually skidding/sliding) and its away-side wheels contact a curb or other vertical obstacle that stops or slows the slide, the lateral momentum of the vehicle causing the impact-side wheels to lift and the vehicle to roll.

As used herein, the term "rollover condition" identifies the situation wherein an actual or impending rollover of the vehicle has been predicted and/or detected. To be effective, a rollover detection system may need to predict an impending rollover that may or may not progress into an actual rollover of the vehicle. In either event, one or more safety-enhancing steps may need to be taken on the basis of the predicted rollover.

In some rollover events it may be the case that occupant safety will be enhanced if the occupant is restrained securely in the seat. If such a rollover condition is detected (block 150, "Yes") the SBCU 74 actuates the away-side retractor to retract the shoulder belt. The amount of force applied by the retractor to retract the away-side shoulder should be at least sufficient to take up any slack in the belt, and may be increased to a specified level that overcomes some amount of resistance to retraction.

Based upon conditions detected by the vehicle safety systems, the RCM 50 may determine that occupant safety will be maximized if the occupant is generally upright and in a centered (left/right) position in the seat. In this case, the impact-side and away-side retractors 38, 40 may be controlled by SBCU 74 so as to independently retract and/or allow extension of the respective belts in an attempt to make the extended lengths of the two belts approximately equal. The extended lengths of the two belts are considered approximately equal if they are within a range of plus or minus 5 centimeters of one another.

While the best mode for carrying out the invention has been described in detail, those familiar with the art to which this invention relates will recognize various alternative designs and embodiments for practicing the invention as defined by the following claims.

What is claimed:

1. A method comprising:
   detecting a lateral force applied to a vehicle during a collision;
   depending upon a direction of the lateral force, locking a first belt retractor engaging a first shoulder belt to prevent extension of the first shoulder belt and unlocking a second belt retractor engaging a second shoulder belt to permit extension of the second shoulder belt;
   detecting a rollover condition; and
   in reaction to the rollover condition, retracting the second shoulder belt to achieve an extended length approximately equal to an extended length of the first shoulder belt.

2. The method according to claim 1 further comprising the step of pre-tensioning at least one of the first and second shoulder belts prior to the step of locking the first belt retractor and unlocking the second belt retractor.

3. The method according to claim 1 further comprising controlling the second belt retractor after unlocking to limit an extended length of the second shoulder belt.

4. The method according to claim 1 further comprising controlling the second belt retractor after unlocking to achieve a load-limiting effect in the second shoulder belt.

5. The method according to claim 1 further comprising retracting the second shoulder belt to achieve a specified level of tension in the second shoulder belt.

6. The method according to claim 1 wherein the step of detecting the lateral force applied to the vehicle is performed by a crash sensor.

7. The method according to claim 1 wherein the step of detecting the rollover condition is performed by a rollover sensor.

8. The method according to claim 7 wherein the rollover sensor comprises an inertial measurement unit.

9. The method according to claim 1 wherein the step of detecting the lateral force applied to the vehicle is performed by a crash sensor and the step of detecting the rollover condition is performed by a rollover sensor, the crash sensor and the rollover sensor both in electronic connection with a CAN bus.

10. The method according to claim 1 wherein the first and second shoulder belt retractors are controlled by a shoulder belt control unit.

11. The method according to claim 10 wherein the shoulder belt control unit is in electronic connection with a CAN bus.

12. A method of controlling an occupant safety system of an automotive vehicle comprising a crash sensor, a rollover sensor, an occupant seat, first and second shoulder belts associated with the occupant seat, and first and second belt retractors engaging the first and second shoulder belts respectively, the method comprising:

operating the crash sensor to detect a direction of force applied to the vehicle during a collision;

in reaction to the direction of force, locking the first belt retractor to prevent extension of the first shoulder belt and unlocking the second belt retractor to permit extension of the second shoulder belt under loading applied by a seat occupant;

operating the rollover sensor to detect a rollover condition occurring after the collision; and in reaction to the rollover condition, retracting the second shoulder belt to achieve an extended length approximately equal to an extended length of the first shoulder belt.

13. The method according to claim 12 further comprising:

pre-tensioning at least one of the first and second shoulder belts prior to locking of the first belt retractors and unlocking of the second belt retractor.

14. The method according to claim 12 wherein the unlocking of the second belt retractor in reaction to the direction of force further comprises limiting a permitted extended length of the second shoulder belt.

15. The method according to claim 12 wherein the unlocking of the second belt retractor in reaction to the direction of force further comprises controlling the second belt retractor to achieve a load-limiting effect in the second shoulder belt.

16. The method according to claim 12 wherein the retraction of the second belt retractor in reaction to the rollover condition further comprises retracting the second shoulder belt to achieve a specified level of tension in the second shoulder belt.

* * * * *